July 7, 1970

E. PADDISON ET AL 3,519,884

ELECTRICAL PROTECTIVE RELAYS

Filed Aug. 30, 1967

Eric Paddison and
John McGill Gillies
Inventors
By: Misegades & Douglas
Attorneys United States Patent Office 3,519,884
Patented July 7, 1970

3,519,884
ELECTRICAL PROTECTIVE RELAYS
Eric Paddison and John McGill Gillies, Stafford, England, assignors to The English Electric Company Limited, London, England, a British company
Filed Aug. 30, 1967, Ser. No. 664,389
Claims priority, application Great Britain, Aug. 31, 1966, 38,791/66
Int. Cl. H02h 3/42
U.S. Cl. 317—27                                    4 Claims

ABSTRACT OF THE DISCLOSURE

This invention relates to a protective relay for comparing the phase sequence of two input signals derived from the protected system and adapted to produce a coincidence signal therefrom during any period in which these signals are in a predetermined phase sequence and their excursions are in the same sense and coincident in time, the signal quantities being so chosen that they are in phase at the "boundary" of operation of the relay. An integrator intergates the coincidence signal and is adapted to develop an output for effecting a protective function only if its duration exceeds a predetermined value whereby to determine the shape of the operating characteristic of the relay and render the relay non-responsive to spurious signals of short duration.

An additional comparator may also be connected to receive these two input signals and their outputs may be connected in series so that they must both operate before a relay operating signal is produced. This mode of connection ensures that the relay does not over-reach its zone of protection in response to D.C. offset errors or superimposed transient oscillations. Alternatively, the outputs from the separate comparators may be connected in parallel whereby to obtain faster operating times under such conditions at the expense of a certain amount of over-reach.

---

This invention relates to electrical protective relays.

From one aspect, the present invention consists in a protective relay for an electrical system, comprising input means for developing two alternating signals proportional to different vectorial quantities representative of electrical conditions in said system, a comparator for comparing the phase sequence of said signals and producing a coincidence signal therefrom during any period in which the said two signals are in a predetermined phase sequence and the excursions thereof are in the same sense and co-incident in time, said quantities being chosen such that the said two signals are in phase at a boundary of operation for the relay, and an integrator for integrating the coincidence signal and adapted to develop an output for effecting a protective function only if the duration of said coincidence signal exceeds a predetermined value whereby to render the relay non-responsive to spurious signals of short duration.

The positive and negative excursions of said signals may conveniently be converted into square waves before their application to the comparator, one of the signals being a voltage IR, where I is the system current and R is a replica of the system resistance up to the said boundary under healthy conditions, and the other signal being a voltage V–IX, where V is the system voltage at the relay and X is a replica of the system reactance up to the said boundary.

The comparator itself may include a thyristor having a first switch connected thereto operable in response to said one signal to complete a cathode circuit for the thyristor, a second switch operable to apply a firing pulse to the thyristor and a third switch operable to inhibit an output from the thyristor, the second and third switches being operable in these modes only in the absence of the said other signal whereby the thyristor fires and produces an output only when said one signal leads the other signal and is coincident with this other signal.

Two separate comparators may each be connected to receive the aforesaid signals and their outputs may be connected in series so that they must both operate before a relay operating signal is produced. This mode of connection ensures that the relay does not over-reach its zone of protection in response to D.C. offset errors or superimposed transient oscillations. Alternatively, the outputs from the separate comparators may be connected in parallel whereby to obtain faster operating times under such conditions at the expense of a certain amount of overreach.

A protective relay according to this invention possesses high accuracy down to small line angles and effects abrupt and sharp operation at the measuring boundary resulting in critical definition of operating points and high speed operation just inside the boundary of the characteristic. In addition, the basic circuit arrangement balances the primary transient response at the boundary and the effects of extraneous transient responses may be cancelled by the use of two comparator channels as mentioned above. Furthermore, the operating characteristic produced by this circuit renders it immune to stray spike signals.

In order that the invention may be fully understood, one embodiment thereof will now be described with reference to the accompanying drawings, in which.

Figure 1:
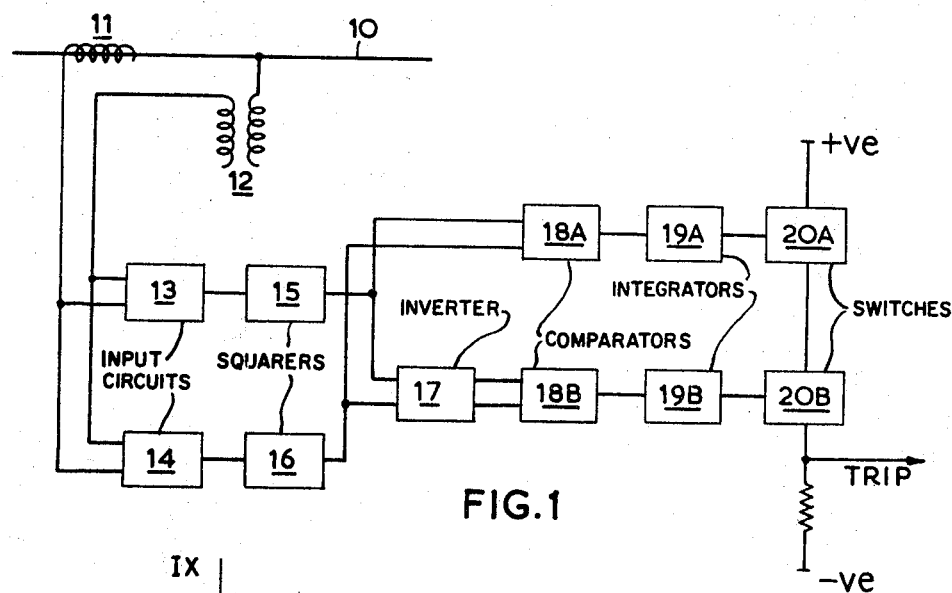
FIG. 1 is a block diagram of a relay according to this invention.
Figure 2:
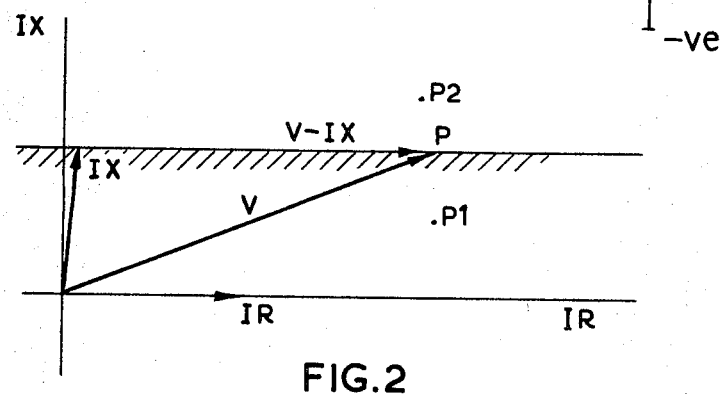
FIG. 2 shows the basic reactance characteristic of the relay.

Referring now to FIG. 1, a power line 10 to be protected has coupled thereto a current transformer 11 and a voltage transformer 12 which supply signals to input circuits 13 and 14 respectively proportional to the line current (I) and line voltage (V). The input circuit 13 includes a replica of the line reactance (X) and develops an output voltage V–IX, and the input circuit 14 includes a replica of the line resistance (R), developing an output voltage IR, V being zero for this circuit. These input circuits may conveniently be of the type shown in FIG. 2 in U.S. Pat. No. 3,378,728.

The positive and negative half cycles of these output voltages from the circuits 13 and 14 are converted into square waves by sensitive balanced squarewave amplifiers 15 and 16, respectively, and are each fed to and compared in identical comparators 18A, 18B. The input to the comparator 18B however, is preceded by a signal inverter 17, e.g. a transistor, so that the comparator 18A receives the positive-going waves from the square-wave amplifiers and the comparator 18B receives the negative-going waves. Any output from these comparators is integrated by integrators 19A, 19B and the outputs therefrom are fed to switching devices 20A, 20B respectively, which are connected in series across a supply source so that an output is developed to trip a line circuit-breaker (not shown) only when both switches are closed. Each of these switches may simply comprise a transistor.

The operation of the relay will now be described with reference to FIGS. 2 to 5. The comparators 18 compare the phase relationship between the two quantities V–IX and IR, and from a consideration of the reactance characteristic produced thereby in FIG. 2 it will be seen that for a fault appearing at a point P the vector quantities V–IX and IR are in phase, whereas for a fault appearing at a point P1, inside the characteristic, IR leads V–IX and for a fault at P2, outside the characteristic, IR lags V–IX. Thus, by arranging for the comparator to produce a tripping signal whenever IR leads V–IX all faults within the zone of protection of the relay may be detected.

Figure 3A:
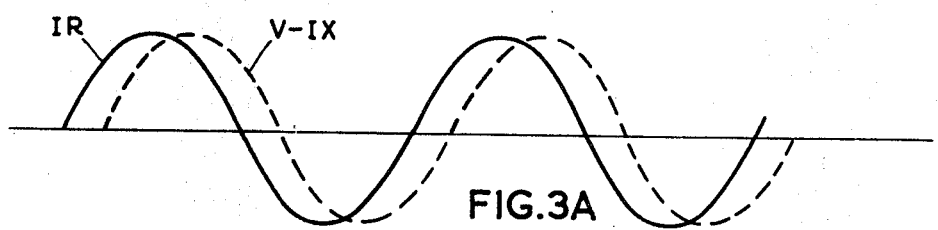
FIGS. 3A and 3B show the input and output waveforms, respectively, of square wave amplifiers incorporated in the relay.
Figure 3B:
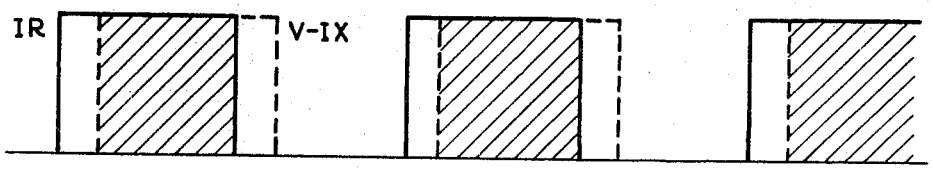

More particularly, the alternating voltage outputs (V–IX) and IR from input circuits 13 and 14 are shown in FIG. 3A for the case in which IR is leading, and these outputs are squared in square wave amplifiers 15, 16 as shown in FIG. 3B, only the positive-going square waves being illustrated. The "overlap" of these square waves, as detected by the comparator, is shown shaded and, as mentioned above, this is indicative of a fault within the zone of protection of the relay.

Figure 4:
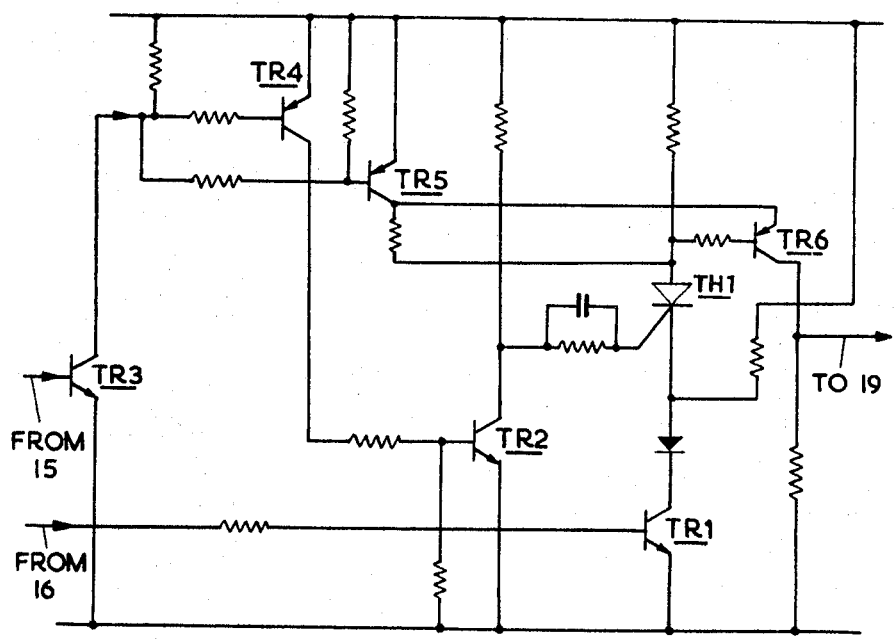
FIG. 4 is a circuit diagram of the comparator.

In order to respond in this manner the comparator may conveniently be connected as shown in FIG. 4, i.e. essentially comprising a thyristor TH1 connected in series with an npn transistor "switch" TR1 across a supply source, the gate electrode of the thyristor being connected in the output circuit of a further npn transistor "switch" TR2. The output from the amplifier 16 (IR) is applied to the base of transistor TR1 and the output from amplifier 15 (V–IX) is applied to the base of transistor TR2 through an npn transistor TR3 and a pnp transistor TR4. The orientation of the input voltage to transistor TR2 is thus the same as that for transistor TR3, but the "inverted" signal from TR3 is additionally applied to a pnp transistor TR5 the output from which is applied to a pnp transistor "switch" TR6 connected in the output lead from the thyristor TH1.

Whilst transistor TR2 is non-containing the gate of the thyristor will be at a positive potential and accordingly, for the case in which IR is leading, the conduction of TR1 will cause the thyristor to fire. Transistor TR6 however will not conduct until an input signal is received from amplifier 15 (V–IX) and although this signal additionally causes transistor TR2 to conduct and clamp the thyristor gate at a negative potential it will not affect the conductive state of this thyristor which will not only cease conduction when transistor TR1 is rendered nonconductive, i.e. at the cessation of the IR pulse as shown in FIG. 3B.

Conversely, for the case in which (V–IX) is leading, conduction of transistor TR2 will connect the gate of the thyristor to a negative potential so that the subsequent conduction of transistor TR1 cannot cause the thyristor to fire. Upon the cessation of this pulse (V–IX) the thyristor will fire but no output will be produced since the transistor "switch" TR6 is non-conductive.

Under the conditions described then, during the 180° over which (V–IX) leads IR the relay will be blocked and during the 180° over which IR leads (V–IX) the relay will operate. When, under this latter condition, the phase displacement $\theta$ is small the output signal will be produced for practically the whole half cycle (180—$\theta$) but when $\theta$ is very nearly equal to 180° the output signal will effectively only be a narrow spike and a response to such signals is undesirable since spurious transients may give rise to this type of signal thus causing maloperation of the relay.

Figure 5:
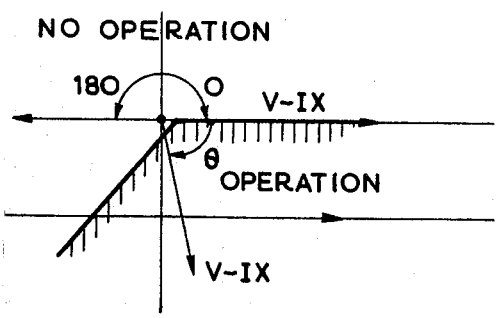
FIG. 5 shows an actual reactance characteristic of the relay, this characteristic being a modification of that shown in FIG. 2 as effected by the provision of an integrator in the output circuit.

Accordingly, the comparator signals are fed into an integrator 19A, 19B which will only operate to develop an output for signals which exceed a predetermined period, e.g. 3 milliseconds, and the affect of this is to modify the reactance characteristic in the manner shown in FIG. 5.

The purpose for having two channels A and B for the comparator and the integrator is to minimise the possibility of the relay over-reaching its zone of protection due to errors in the transient components caused by the line current and voltage coupling transformers whereby the quantities presented thereby to the comparators may not exactly balance. Thus, for example, if a D.C. offset error causes one channel to over-reach by reason of the extended pulse duration the other channel will receive a pulse of shortened duration and accordingly under-reach so as to prevent an output being developed until this offset error has disappeared. Should there be no transient conditions, then both channels will operate substantially simultaneously and there will be no delay in operation.

On the other hand, if a certain amount of over-reach can be tolerated then the switches 20A, 20B may be omitted and the two channels connected in parallel, since this will result in a faster operating time for the relay.

It is to be understood that this invention is not limited to the particular arrangement disclosed and many modifications could be introduced without departing from the scope of the invention, for example, only one comparator channel may be employed instead of the two shown, twin channels only being provided to realize the additional advantages with regard to transients and operating times as discussed above.

We claim:

1. A protective relay for an electrical system, comprising input means for developing two alternating signals proportional to different vectorial quantities representative of electrical conditions in said system, one of the alternating signals being proportional to the product IR, where I is the system current and R is a replica of the system resistance up to the boundary of operation of the relay, and the other signal being proportional to V–IX, where V is the system voltage at the relay and X is a replica of the system reactance up to the said boundary, square-wave amplifiers for converting the alternating signals into square waveforms, a comparator for comparing the phase sequence of said waveforms and producing a coincidence signal therefrom during any period in which they are in a predetermined phase sequence and their excursions are in the same sense and coincident in time, said quantities being chosen such that the said two waveforms are in phase at a boundary of operation of the relay, and an integrator for integrating the coincidence signal and adapted to develop an output for effecting a protective function only if the duration of said coincidence signal exceeds a predetermined value whereby to determine the shape of the operating characteristic of the relay and to render it non-responsive to spurious signals of short duration.

2. A relay according to claim 1, wherein the comparator comprises a thyristor having connected thereto a first switch operable in response to the said one signal to complete the cathode circuit of the thyristor, a second switch operable to condition the thyristor gate for conduction, and a third switch operable to inhibit an output from the thyristor, the second and third switches being operable in these modes only in the absence of the said other signal whereby the thyristor fires and produces an output only when said one signal leads the other signal and is coincident with this other signal.

3. A relay according to claim 1, comprising two channels in which a said comparator and a said integrator are connected together, the two channels separately receiving the positive-going and the negative-going square waveforms of the two signals, respectively, and connecting means connecting the outputs from the two channels in parallel whereby the protective function is effected independently of one another.

4. A relay according to claim 1, comprising
two channels in which a said comparator and a said integrator are connected together, the two channels separately receiving the positive-going and the negative-going square waveforms of the two signals, respectively,
two switching means separately connected to the outputs of the two channels and
connecting means for connecting the two switching means in series whereby the protective function is effected only when outputs have been developed from both of the channels.

References Cited

UNITED STATES PATENTS

| | | | |
|---|---|---|---|
| 3,369,156 | 2/1968 | Souillard | 317—36 |
| 3,374,399 | 3/1968 | Dewey | 317—36 |
| 3,378,728 | 4/1968 | Humpage et al. | 317—36 |

JAMES D. TRAMMELL, Primary Examiner

U.S. Cl.X.R.

317—36, 47